(12) United States Patent
Sun (10) Patent No.: US 11,282,514 B2
(45) Date of Patent: Mar. 22, 2022

(54) METHOD AND APPARATUS FOR RECOGNIZING VOICE (71) Applicant: Baidu Online Network Technology (Beijing) Co., Ltd, Beijing (CN)

(72) Inventor: Jianwei Sun, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 266 days.

(21) Appl. No.: 16/568,146

(22) Filed: Sep. 11, 2019

(65) Prior Publication Data

US 2020/0193979 A1 Jun. 18, 2020

(30) Foreign Application Priority Data

Dec. 18, 2018 (CN) .......................... 201811549488.8

(51) Int. Cl.
*G10L 15/20* (2006.01)
*G06F 17/18* (2006.01)
*G06N 20/00* (2019.01)
*G10L 25/84* (2013.01)

(52) U.S. Cl.
CPC .............. *G10L 15/20* (2013.01); *G06F 17/18* (2013.01); *G06N 20/00* (2019.01); *G10L 25/84* (2013.01)

(58) Field of Classification Search
None
See application file for complete search history.

(56) References Cited

U.S. PATENT DOCUMENTS

| 10,461,712 | B1 * | 10/2019 | Yang | ...................... H03G 7/002 |
| 2014/0278415 | A1 * | 9/2014 | Ivanov | .................. G10L 15/063 704/246 |
| 2016/0253995 | A1 * | 9/2016 | Zhou | ........................ H04R 3/00 704/233 |
| 2018/0154150 | A1 * | 6/2018 | Boven | .................. H04R 25/505 |

* cited by examiner

*Primary Examiner* — Quynh H Nguyen
(74) *Attorney, Agent, or Firm* — Kilpatrick Townsend & Stockton LLP (57) ABSTRACT

Embodiments of the present disclosure disclose a method and apparatus for recognizing a voice. A specific implementation of the method includes: acquiring an audio signal; determining a signal-to-noise ratio of the audio signal; and selecting a voice recognition model from a pre-trained voice recognition model group to perform voice recognition on the audio signal according to the determined signal-to-noise ratio. This embodiment improves the robustness of a voice recognition product for recognizing voices in different application scenarios.

10 Claims, 6 Drawing Sheets

METHOD AND APPARATUS FOR RECOGNIZING VOICE

CROSS-REFERENCE TO RELATED APPLICATIONS

This application claims priority to Chinese Patent Application No. 201811549488.8, filed with the China National Intellectual Property Administration (CNIPA) on Dec. 18, 2018, the content of which is incorporated herein by reference in its entirety.

TECHNICAL FIELD

Embodiments of the present disclosure relate to the field of computer technology, specifically to a method and apparatus for recognizing a voice.

BACKGROUND

Voice recognition products typically use voice recognition technology to recognize voices.

In related art, when the application scenario of a voice recognition product changes, for example, from a quiet application scenario to a noisy application scenario, it may affect the robustness of the voice recognition product to recognize a voice.

SUMMARY

Embodiments of the present disclosure propose a method and apparatus for recognizing a voice.

In a first aspect, some embodiments of the present disclosure provides a method for recognizing a voice, including: acquiring an audio signal; determining a signal-to-noise ratio of the audio signal; and selecting a voice recognition model from a pre-trained voice recognition model group to perform voice recognition on the audio signal according to the determined signal-to-noise ratio (SNR).

In some embodiments, the determining a signal-to-noise ratio of the audio signal, includes: determining a silence segment and a noise segment of the audio signal; and obtaining the signal-to-noise ratio of the audio signal based on energy of the silence segment and energy of the noise segment.

In some embodiments, the selecting a voice recognition model from a pre-trained voice recognition model group to perform voice recognition on the audio signal according to the determined signal-to-noise ratio, includes: selecting a signal-to-noise ratio range matching the signal-to-noise ratio from a signal-to-noise ratio range group; and selecting a voice recognition model corresponding to the selected signal-to-noise ratio range to perform voice recognition on the audio signal.

In some embodiments, the signal-to-noise ratio range group is determined by the following steps: acquiring a sample audio signal set; for a sample audio signal in the sample audio signal set, determining a silence segment and a noise segment of the sample audio signal, obtaining a signal-to-noise ratio of the audio signal based on energy of the determined silence segment and energy of the determined noise segment, and storing the signal-to-noise ratio of the audio signal into a signal-to-noise ratio set; generating a signal-to-noise ratio statistical histogram based on signal-to-noise ratios in the signal-to-noise ratio set, where the signal-to-noise ratio statistical histogram is used to indicate a distribution characteristic of signal-to-noise ratio values; and determining the signal-to-noise ratio range group based on the signal-to-noise ratio statistical histogram.

In some embodiments, the voice recognition model in the voice recognition model group is obtained by following steps: acquiring a training sample set corresponding to the voice recognition model, where a training sample includes a sample audio signal and a sample recognition result, a signal-to-noise ratio of the sample audio signal belonging to a signal-to-noise ratio range corresponding to the training sample set; and training to obtain the voice recognition model using a machine learning method, by taking the sample audio signal of the training sample in the training sample set as an input and the sample recognition result of the input training sample as a desired output.

In a second aspect, some embodiments of the present disclosure provides an apparatus for recognizing a voice, including: an information acquisition unit, configured to acquire an audio signal; an information determining unit, configured to determine a signal-to-noise ratio of the audio signal; and a model selection unit, configured to select a voice recognition model from a pre-trained voice recognition model group to perform voice recognition on the audio signal according to the determined signal-to-noise ratio.

In some embodiments, the information determining unit is further configured to: determine a silence segment and a noise segment of the audio signal; and obtain the signal-to-noise ratio of the audio signal based on energy of the silence segment and energy of the noise segment.

In some embodiments, the model selection unit is further configured to: select a signal-to-noise ratio range matching the signal-to-noise ratio from a signal-to-noise ratio range group; and select a voice recognition model corresponding to the selected signal-to-noise ratio range to perform voice recognition on the audio signal.

In some embodiments, the signal-to-noise ratio range group is determined by the following steps: acquiring a sample audio signal set; for a sample audio signal in the sample audio signal set, determining a silence segment and a noise segment of the sample audio signal, obtaining a signal-to-noise ratio of the audio signal based on energy of the determined silence segment and energy of the determined noise segment, and storing the signal-to-noise ratio of the audio signal into a signal-to-noise ratio set; generating a signal-to-noise ratio statistical histogram based on signal-to-noise ratios in the signal-to-noise ratio set, where the signal-to-noise ratio statistical histogram is used to indicate a distribution characteristic of signal-to-noise ratio values; and determining the signal-to-noise ratio range group based on the signal-to-noise ratio statistical histogram.

In some embodiments, the voice recognition model in the voice recognition model group is obtained by the following steps: acquiring a training sample set corresponding to the voice recognition model, where a training sample includes a sample audio signal and a sample recognition result, a signal-to-noise ratio of the sample audio signal belonging to a signal-to-noise ratio range corresponding to the training sample set; and training to obtain the voice recognition model using a machine learning method, by taking the sample audio signal of the training sample in the training sample set as an input and the sample recognition result of the input training sample as a desired output.

In a third aspect, some embodiments of the present disclosure provides a server, including: one or more processors; and a storage apparatus, storing one or more programs thereon, the one or more programs, when executed by the one or more processors, cause the one or more processors to implement the method for recognizing a voice according to any one of the embodiments.

In a fourth aspect, some embodiments of the present disclosure provides a computer readable storage medium, storing a computer program thereon, the program, when executed by a processor, implements the method for recognizing a voice according to any one of the embodiments.

The method and apparatus for recognizing a voice provided by the embodiments of the present disclosure may first acquire an audio signal, then determine a signal-to-noise ratio of the audio signal, and finally select, according to the determined signal-to-noise ratio, a voice recognition model from a pre-trained voice recognition model group to perform voice recognition on the audio signal. The method and apparatus provided by the embodiments of the present disclosure selects a voice recognition model suitable for the current scenario base on the signal-to-noise ratio of the acquired audio signal, which is helpful to improve the robustness of a voice recognition product for recognizing voices in different application scenarios.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

Embodiments of the present disclosure will be further described below in detail in combination with the accompanying drawings. It may be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should be noted that some embodiments in the present disclosure and some features in the disclosure may be combined with each other on a non-conflict basis. Features of the present disclosure will be described below in detail with reference to the accompanying drawings and in combination with the embodiments.

Figure 1:
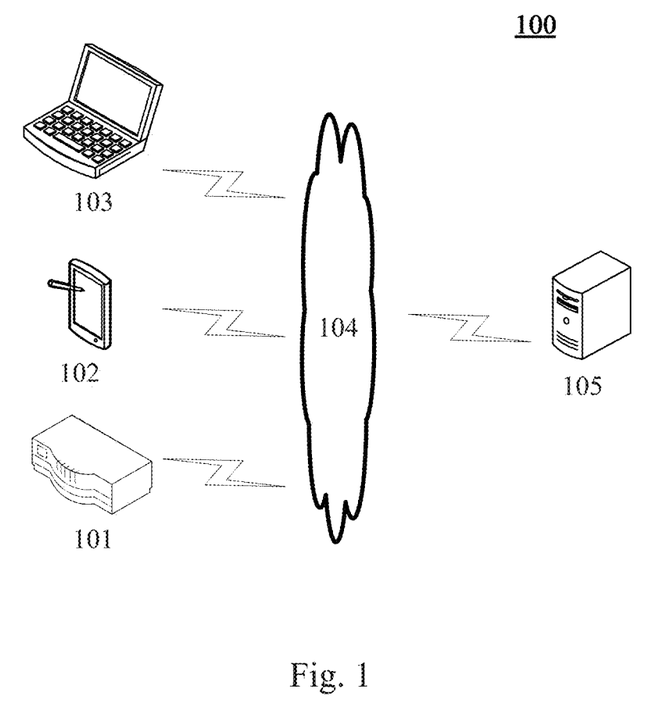
FIG. 1 is an exemplary system architecture diagram to which an embodiment of the present disclosure may be applied.

FIG. 1 illustrates an exemplary system architecture 100 of a method for recognizing a voice or an apparatus for recognizing a voice to which the embodiments of the present disclosure may be applied.

As shown in FIG. 1, the system architecture 100 may include terminal devices 101, 102, 103, a network 104, and a server 105. The network 104 is used to provide a communication link medium between the terminal devices 101, 102, 103 and the server 105. The network 104 may include various types of connections, such as wired, wireless communication links, or optic fibers.

The terminal devices 101, 102, 103 may interact with the server 105 via the network 104 to receive or send messages and the like. Various applications such as voice recognition applications, or voice analysis applications may be installed on the terminal devices 101, 102, and 103.

The terminal devices 101, 102, 103 may be hardware or software. When the terminal devices 101, 102, 103 are hardware, they may be various electronic devices supporting audio signal input, including but not limited to smart phones, tablets, laptop portable computers, vehicle-mounted terminals, and the like. When the terminal devices 101, 102, 103 are software, they may be installed in the above-listed electronic devices. They may be implemented as a plurality of software or software modules (for example, for providing distributed services) or as a single software or software module, which is not specifically limited herein.

The server 105 may be a server that provides various services, such as a backend server that provides support for the applications installed in the terminal devices 101, 102, 103. The backend server may determine the signal-to-noise ratio of an audio signal input by the terminal devices 101, 102, 103, and select, according to the determined signal-to-noise ratio, a voice recognition model from a pre-trained voice recognition model group to perform voice recognition on the audio signal.

It should be noted that the server may be hardware or software. When the server is hardware, it may be implemented as a distributed server cluster composed of multiple servers, or may be implemented as a single server. When the server is software, it may be implemented as a plurality of software or software modules (for example, for providing distributed services), or as a single software or software module, which is not specifically limited herein.

It should be noted that the method for recognizing a voice provided by the embodiments of the present disclosure is generally performed by the terminal devices 101, 102, 103. Accordingly, the apparatus for recognizing a voice is generally disposed in the terminal devices 101, 102, 103. It should be noted that the terminal devices 101, 102, 103 may also determine the signal-to-noise ratio of the audio signal, and select, according to the determined signal-to-noise ratio, a voice recognition model from a pre-trained voice recognition model group to perform voice recognition on the audio signal. At this point, the exemplary system architecture 100 may not include the network 104 and the server 105.

It should be understood that the number of terminal devices, networks, and servers in FIG. 1 is merely illustrative. Depending on the implementation needs, there may be any number of terminal devices, networks, and servers.

Figure 2:
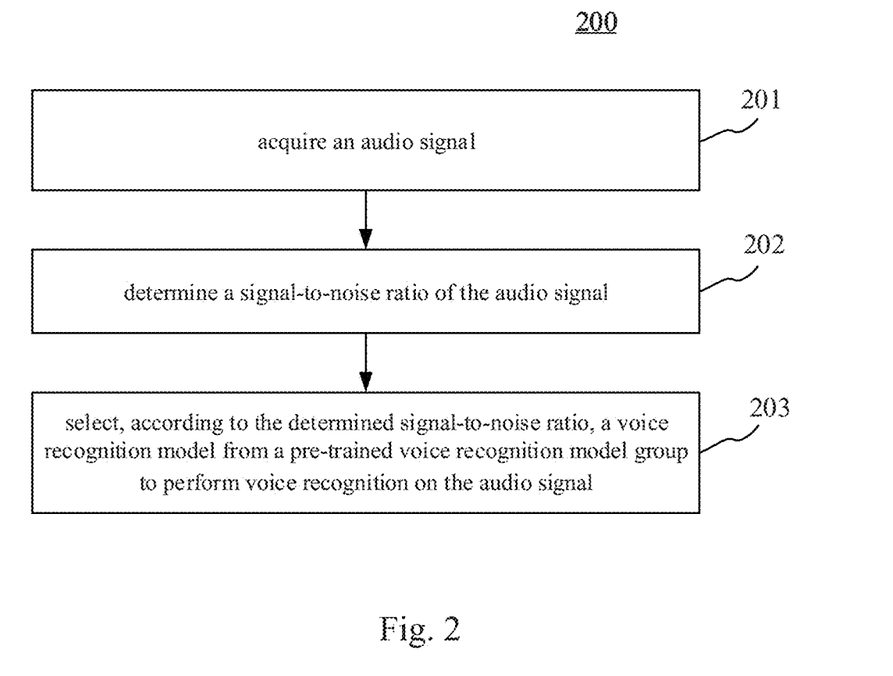
FIG. 2 is a flowchart of a method for recognizing a voice according to an embodiment of the present disclosure.

With further reference to FIG. 2, a flow 200 of a method for recognizing a voice according to an embodiment of the present disclosure is illustrated. The method for recognizing a voice includes the following steps:

Step 201, acquiring an audio signal.

In the present embodiment, an executive body of the method for recognizing a voice (for example, the terminal devices 101, 102, 103 shown in FIG. 1) may acquire the audio signal in accordance with a preset audio signal acquisition period. The audio signal is typically an information carrier carrying sound waves with varying frequency and amplitude. A voice signal is included in the audio signal. The preset audio signal acquisition period may be various period values preset by those skilled in the art. For example, the audio signal acquisition period may be set to be 1 second, or may be set to be 1 minute.

Step 202, determining a signal-to-noise ratio of the audio signal.

In the present embodiment, the executive body determines the signal-to-noise ratio of the audio signal after acquiring the audio signal. Here, the signal-to-noise ratio usually refers to the ratio of the signal to the noise in an electronic device or electronic system. In the present embodiment, the executive body may determine the ratio of the energy of the audio signal to the energy of a background noise in the audio signal as the signal-to-noise ratio of the audio signal. Here, the background noise in the audio signal may usually be obtained using a background noise separation algorithm. As an example, the background noise separation algorithm may be a blind source separation (BSS), or may be other algorithms. It should be noted that how to acquire the energy of the audio signal and the energy of the background noise are well known in the art, and detailed description thereof will be omitted.

In some alternative implementations of the present embodiment, the executive body may determine the signal-to-noise ratio of the audio signal by the following steps:

In the first step, determining a silence segment and a noise segment of the audio signal. Alternatively, the executive body may detect the noise segment of the audio signal using a voice activity detection (VAD) model, and then determine the non-noise segment portion of the audio signal as the silence segment. The silence segment is an audio signal portion not including a voice, and the noise segment is an audio signal portion including a voice. It should be noted that the executive body may also determine the silence segment and the noise segment of the audio signal by other means, which is not limited herein.

In the second step, obtaining the signal-to-noise ratio of the audio signal based on energy of the silence segment and energy of the noise segment. Here, the executive body may calculate the signal-to-noise ratio of the audio signal by using the energy of the silence segment and the energy of the noise segment. For example, given the noise segment energy is N1, the silence segment energy is N2. In this case, the executive body may calculate the signal-to-noise ratio of the audio signal by the following method: SNR=(N1−N2)/N2. The executive body may also calculate the signal-to-noise ratio of the audio signal by the following method: SNR=N1/N2. It should be noted that how to obtain the energy of the silence segment and the energy of the noise segment are well known in the art, and detailed description thereof will be omitted.

Step 203, selecting, according to the determined signal-to-noise ratio, a voice recognition model from a pre-trained voice recognition model group to perform voice recognition on the audio signal.

In the present embodiment, the executive body may select the voice recognition model from the pre-trained voice recognition model group by the following method: finding, based on the determined signal-to-noise ratio, the voice recognition model corresponding to the signal-to-noise ratio from a pre-stored signal-to-noise ratio-voice recognition model corresponding relationship table. Here, the signal-to-noise ratio-voice recognition model corresponding relationship table may be a table pre-established by the executive body and storing a plurality of corresponding relationships between signal-to-noise ratios and voice recognition models.

In some alternative implementations of the present embodiment, the selecting, according to the determined signal-to-noise ratio, a voice recognition model from a pre-trained voice recognition model group to perform voice recognition on the audio signal includes: selecting a signal-to-noise ratio range matching the signal-to-noise ratio from a signal-to-noise ratio range group; and selecting a voice recognition model corresponding to the selected signal-to-noise ratio range to perform voice recognition on the audio signal.

In the present embodiment, the executive body may also select the voice recognition model from the pre-trained voice recognition model group by the following steps:

In the first step, selecting a signal-to-noise ratio range that matches the signal-to-noise ratio from a signal-to-noise ratio range group. Here, the executive body may match the determined signal-to-noise ratio with signal-to-noise ratio ranges in the signal-to-noise ratio range group one by one, thereby obtains the signal-to-noise ratio range that matches the determined signal-to-noise ratio. If the determined signal-to-noise ratio belongs to a certain signal-to-noise ratio range, it is considered that the certain signal-to-noise ratio range matches the determined signal-to-noise ratio. For example, given the determined signal-to-noise ratio is SNR, and the signal-to-noise ratio range group is (A, B, C, D), here, A, B, C, and D are signal-to-noise ratio ranges respectively. In this case, if SNR belongs to A, it may be considered that the signal-to-noise ratio range A matches the signal-to-noise ratio SNR.

In the second step, selecting a voice recognition model corresponding to the selected signal-to-noise ratio range to perform voice recognition on the audio signal. In the present embodiment, each of the signal-to-noise ratio ranges in the signal-to-noise ratio range group is associated with a voice recognition model. The executive body may obtain the voice recognition model associated with the signal-to-noise ratio range, after obtaining the signal-to-noise ratio range that matches the determined signal-to-noise ratio.

In some alternative implementations of the present embodiment, a signal-to-noise ratio range in the signal-to-noise ratio range group is associated with a voice recognition model identity. The selecting a voice recognition model corresponding to the selected signal-to-noise ratio range to perform voice recognition on the audio signal includes: determining the voice recognition model based on a voice recognition model identity associated with the selected signal-to-noise ratio range. Voice recognition is performed on the audio signal using the determined voice recognition model. In the present embodiment, the executive body may obtain the voice recognition model identity associated with the signal-to-noise ratio range, after obtaining the signal-to-noise ratio range that matches the determined signal-to-noise ratio. Thereby, the voice recognition model indicated by the voice recognition model identity may be obtained.

In some alternative implementations of the present embodiment, the signal-to-noise ratio range group may be obtained, by the above-mentioned executive body or other executive body for determining the signal-to-noise ratio range group, by executing the following steps:

In the first step, acquiring a sample audio signal set.

In the second step, for a sample audio signal in the sample audio signal set, determining a silence segment and a noise segment of the sample audio signal, obtaining a signal-to-noise ratio of the audio signal based on energy of the determined silence segment and energy of the determined noise segment, and storing the signal-to-noise ratio of the audio signal into a signal-to-noise ratio set. Here, the method used by the executive body for obtaining the signal-to-noise ratios of the respective sample audio signals in the sample audio signal set is the same as the method for obtaining the signal-to-noise ratio of the audio signal in step 202, and detailed description thereof will be omitted.

In the third step, generating a signal-to-noise ratio statistical histogram based on signal-to-noise ratios in the signal-to-noise ratio set, here, the signal-to-noise ratio statistical histogram is used to indicate a distribution characteristic of signal-to-noise ratio values. In the present embodiment, different values of the signal-to-noise ratios are shown on the abscissa of the signal-to-noise ratio statistical histogram, and the numbers of sample audio signals corresponding to the signal-to-noise ratio values are shown on the ordinate.

In the fourth step, determining the signal-to-noise ratio range group based on the signal-to-noise ratio statistical histogram. Here, the executive body may first divide the abscissa of the signal-to-noise ratio statistical histogram into a set number of transverse subranges. The transverse subranges are subranges obtained by dividing the abscissa. Then, the sums of the values of the ordinates within the respective transverse subranges are calculated. Finally, the transverse subranges having a sum of the ordinate values greater than a preset threshold are selected from the set number of horizontal subranges, and combined to form the signal-to-noise ratio range group.

In some alternative implementations of the present embodiment, the signal-to-noise ratio range group may also be determined by the executive body through the following steps:

First, determining a value range of the coordinate data in the signal-to-noise ratio statistical histogram along the ordinate direction, and dividing the value range into a first number of longitudinal subranges of equal spacings, where the longitudinal subranges are subranges obtained by dividing the ordinate. As an example, given that four pieces of coordinate data are recorded in the signal-to-noise ratio statistical histogram: (0.2, 10), (0.3, 15), (0.4, 15), (0.5, 18). Then, the value range may be [10, 18]. In this case, if the first number is 2, after the value range is equally divided into the first number of vertical subranges, two longitudinal subranges may be obtained, which are [10, 14] and [14, 18], respectively.

Then, for a longitudinal subrange in the first set number of vertical subranges, determining the total number of sample audio signals whose ordinate values fall into the longitudinal subrange in the signal-to-noise ratio statistical histogram, and storing the determined total number in a total number set. As an example, given that there are four pieces of coordinate data recorded in the signal-to-noise ratio statistical histogram: (0.2, 10), (0.3, 15), (0.4, 15), (0.5, 18). There are two longitudinal subranges, [10, 14] and [14, 18], respectively. In this case, for the longitudinal subrange [10, 14], the coordinate data whose ordinate value falls into the longitudinal subrange is (0.2, 10). The total number of sample audio signals that fall into the longitudinal subrange [10, 14] may be obtained as 10. For the longitudinal subrange [14, 18], the coordinate data whose ordinate values fall into the vertical subrange are (0.3, 15), (0.4, 15), (0.5, 18). The total number of sample audio signals that fall into the longitudinal subrange [14, 18] may be obtained as 15+15+18. In this way, the total number set may be obtained as {10, 48}.

Then, screening a second number of total number from the total number set from large to small, and obtaining a corresponding second number of longitudinal subranges. Here, since a longitudinal subrange has a total number, the executive body may obtain the longitudinal subranges corresponding to the total number when the total number is obtained during the screening to obtain the total number.

Finally, for a longitudinal subrange in the second number of longitudinal subranges, determining a range formed by abscissa value of at least one coordinate data whose ordinate value falls into the longitudinal subrange as the signal-to-noise ratio range corresponding to the longitudinal subrange, and storing the longitudinal subrange in the signal-to-noise ratio range group. Here, for any of the second number of vertical subranges, if the longitudinal subrange subrange is [14, 18], the coordinate data whose ordinate values fall into the longitudinal subrange[14, 18] are (0.3, 15), (0.4, 15) and (0.5, 18), respectively. Then, the range formed at this point is [0.3, 0.5].

In some alternative implementations of the present embodiment, a voice recognition model in the voice recognition model group may be obtained by the above-mentioned executive body or other executive body for training the voice recognition model by the following steps:

In the first step, acquiring a training sample set corresponding to the voice recognition model. Here, a training sample includes a sample audio signal and a sample recognition result, a signal-to-noise ratio of the sample audio signal belonging to a signal-to-noise ratio range corresponding to the training sample set. In the present embodiment, each voice recognition model in the voice recognition model group corresponds to one training sample set. In addition, each voice recognition model in the voice recognition model group is associated with one signal-to-noise ratio range. The signal-to-noise ratio of each sample audio signal in the training sample set of the voice recognition model belongs to the signal-to-noise ratio range associated with the voice recognition model.

In the second step, training to obtain the voice recognition model by using a machine learning method, by taking the sample audio signal of the training sample in the training sample set as an input and the sample recognition result of the input training sample as a desired output. Here, the executive body may train an initial deep learning model, and the initial deep learning model may be an untrained deep learning model or a deep learning model with the training uncompleted. The layers of the initial deep learning model may be set with initial parameters, and the parameters may be continuously adjusted during the training of the deep learning model. The initial deep learning model may be various types of untrained or training uncompleted artificial neural networks or models obtained by combining a plurality of untrained or training uncompleted artificial neural networks. For example, the initial deep learning model may be an untrained convolutional neural network, an untrained recurrent neural network, or a model obtained by combining an untrained convolutional neural network, an untrained recurrent neural network, and an untrained fully connected layer. In this way, the executive body may input the sample audio signal from the input end of the deep learning model, sequentially process the sample audio signal through the parameters of the layers in the deep learning model, and output from the output end of the deep learning model. Information output from the output end is the sample recognition result.

Figure 3:
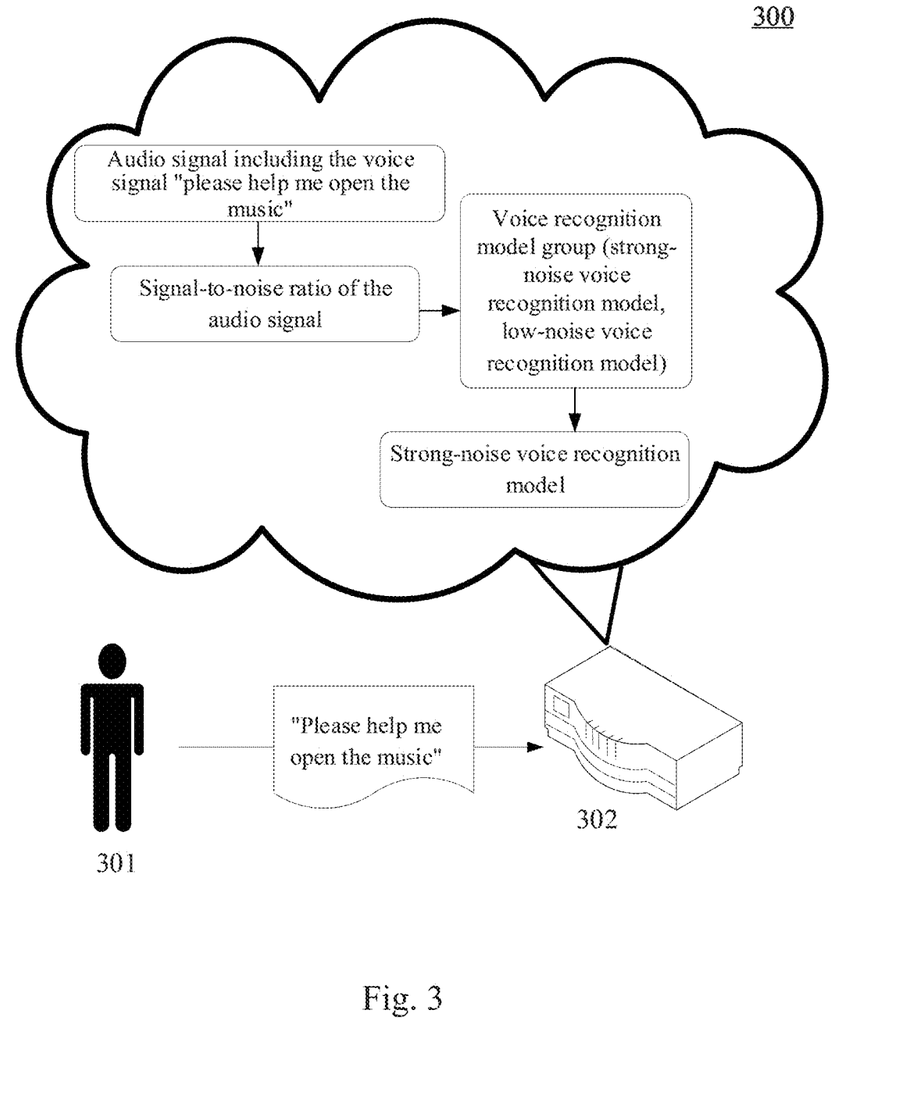
FIG. 3 is a schematic diagram of an application scenario of the method for recognizing a voice according to an embodiment of the present disclosure.

With further reference to FIG. 3, FIG. 3 is a schematic diagram of an application scenario of the method for recognizing a voice according to the present embodiment. The terminal device may be a vehicle-mounted terminal. In an application scenario 300 of FIG. 3, a user 301 in the car issues a voice signal "please help me open the music". First, a vehicle-mounted terminal 302 acquires an audio signal including the voice signal "please help me open the music". Then, the signal-to-noise ratio of the audio signal is determined. Finally, according to the determined signal-to-noise ratio, a strong-noise voice recognition model is selected from a pre-trained voice recognition model group (strong-noise voice recognition model, low-noise voice recognition model) to perform voice recognition on the audio signal.

The method for recognizing a voice provided by the above embodiment of the present disclosure may first acquire an audio signal, then determine a signal-to-noise ratio of the audio signal, and finally select a voice recognition model from a pre-trained voice recognition model group to perform voice recognition on the audio signal according to the determined signal-to-noise ratio. The method provided by the embodiments of the present disclosure selects a voice recognition model suitable for the current scenario based on the signal-to-noise ratio of the acquired audio signal, which is helpful to improve the robustness of a voice recognition product for recognizing voices in different application scenarios.

Figure 4:
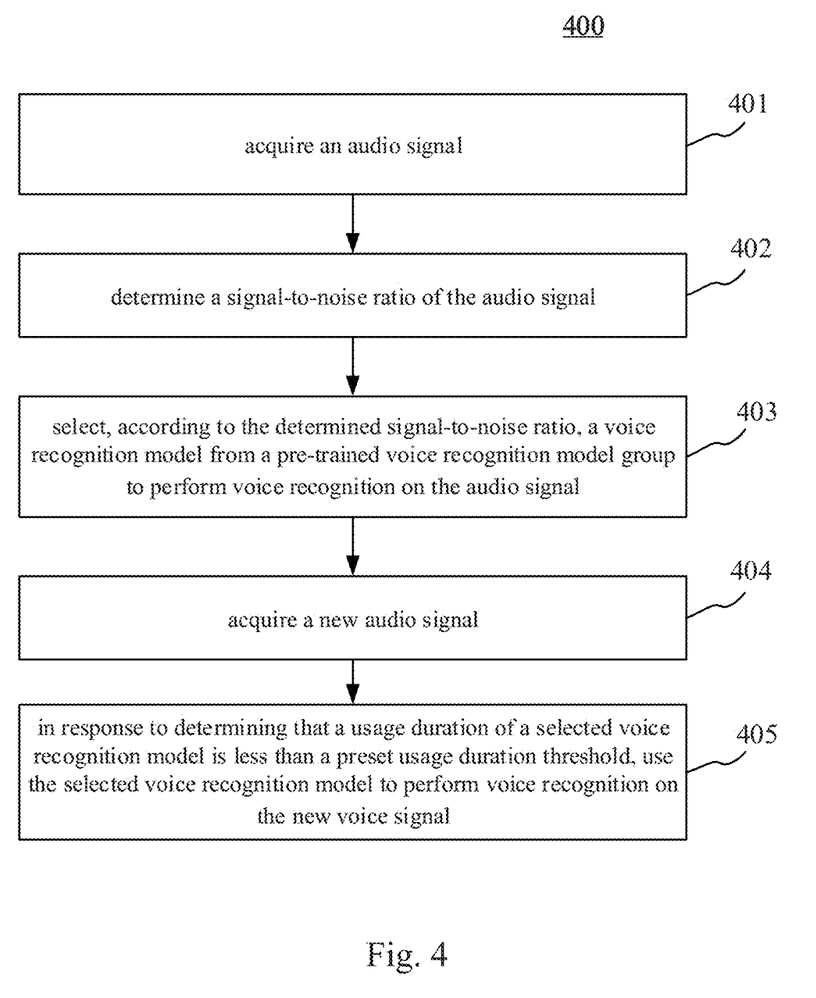
FIG. 4 is a flowchart of the method for recognizing a voice according to another embodiment of the present disclosure.

With further reference to FIG. 4, a flow 400 of another embodiment of the method for recognizing a voice is illustrated. The flow 400 of the method for recognizing a voice includes the following steps:

Step 401, acquiring an audio signal.

Step 402, determining a signal-to-noise ratio of the audio signal.

Step 403, selecting, according to the determined signal-to-noise ratio, a voice recognition model from a pre-trained voice recognition model group to perform voice recognition on the audio signal.

In the present embodiment, the specific operations of steps 401-403 are substantially the same as the operations of steps 201-203 in the embodiment shown in FIG. 2, and detailed description thereof will be omitted.

Step 404, acquiring a new audio signal.

In the present embodiment, the method for acquiring the new audio signal by the executive body is substantially the same as the method for acquiring the audio signal in step 201, and detailed description thereof will be omitted.

Step 405, in response to determining that a usage duration of a selected voice recognition model is less than a preset usage duration threshold, using the selected voice recognition model to perform voice recognition on the new voice signal.

In the present embodiment, after completing the selection of the voice recognition model for once, the executive body may start timing. If the usage duration of the selected voice recognition model is less than the preset usage duration threshold, the selected voice recognition model is used continuously to perform voice recognition on the subsequently acquired new audio signal. If the usage duration of the selected voice recognition model is greater than the preset usage duration threshold, then steps 402-403 are performed to reselect a voice recognition model suitable for the current scenario. The preset usage duration threshold may be a data value preset by those skilled in the art.

In the present embodiment, selecting a voice recognition model at set time intervals (i.e., the time length indicated by the usage duration threshold) helps to improve the data processing efficiency of a voice recognition product for voice recognition.

As can be seen from FIG. 4, compared with the embodiment corresponding to FIG. 2, the flow 400 of the method for recognizing a voice in the present embodiment reflects the step that when the usage duration of the selected voice recognition model is less than a preset usage duration threshold, the selected voice recognition model is used continuously to perform voice recognition on the subsequently acquired new audio signal. Therefore, the solution described in the present embodiment may help improve the robustness of the voice recognition product to recognize the voices in different application scenarios, and may improve the data processing efficiency of the voice recognition product for voice recognition.

Figure 5:
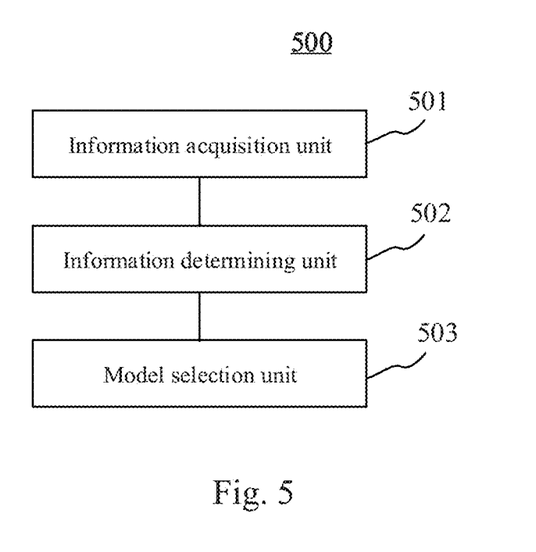
FIG. 5 is a schematic structural diagram of an apparatus for recognizing a voice according to an embodiment of the present disclosure.

With further reference to FIG. 5, as an implementation of the method shown in the above figures, the present disclosure provides an embodiment of an apparatus for recognizing a voice, and the apparatus embodiment corresponds to the method embodiment as shown in FIG. 2, and the apparatus may be specifically applied to various servers.

As shown in FIG. 5, the apparatus 500 for recognizing a voice of the present embodiment includes: an information acquisition unit 501, configured to acquire an audio signal; an information determining unit 502, configured to determine a signal-to-noise ratio of the audio signal; and a model selection unit 503, configured to select a voice recognition model from a pre-trained voice recognition model group to perform voice recognition on the audio signal according to the determined signal-to-noise ratio.

In some alternative implementations of the present embodiment, the information determining unit is further configured to: determine a silence segment and a noise segment of the audio signal; and obtain the signal-to-noise ratio of the audio signal based on energy of the silence segment and energy of the noise segment.

In some alternative implementations of the present embodiment, the model selection unit is further configured to: first, select a signal-to-noise ratio range matching the signal-to-noise ratio from a signal-to-noise ratio range group; and then select a voice recognition model corresponding to the selected signal-to-noise ratio range to perform voice recognition on the audio signal.

In some alternative implementations of the present embodiment, the signal-to-noise ratio range group is determined by the following steps: first, acquiring a sample audio signal set; then for a sample audio signal in the sample audio signal set, determining a silence segment and a noise segment of the sample audio signal, obtaining a signal-to-noise ratio of the audio signal based on energy of the determined silence segment and energy of the determined noise segment, and storing the signal-to-noise ratio of the audio signal into a signal-to-noise ratio set; then generating a signal-to-noise ratio statistical histogram based on signal-to-noise ratios in the signal-to-noise ratio set, where the signal-to-noise ratio statistical histogram is used to indicate a distribution characteristic of signal-to-noise ratio values; and finally determining the signal-to-noise ratio range group based on the signal-to-noise ratio statistical histogram.

In some alternative implementations of the present embodiment, the voice recognition model in the voice recognition model group is obtained by: first, acquiring a training sample set corresponding to the voice recognition model, where a training sample includes a sample audio signal and a sample recognition result, a signal-to-noise ratio of the sample audio signal belonging to a signal-to-noise ratio range corresponding to the training sample set; and then training to obtain the voice recognition model using a machine learning method, by taking the sample audio signal of the training sample in the training sample set as an input and the sample recognition result of the input training sample as a desired output.

In the apparatus for recognizing a voice provided by the above embodiment of the present disclosure, the information acquisition unit 501 acquires an audio signal. Then, the information determining unit 502 determines a signal-to-noise ratio of the audio signal. Finally, the model selection unit 503 selects a voice recognition model from a pre-trained voice recognition model group to perform voice recognition on the audio signal according to the determined signal-to-noise ratio. The apparatus of the present embodiment selects a voice recognition model suitable for the current scenario based on the signal-to-noise ratio of the acquired audio signal, which is helpful to improve the robustness of a voice recognition product for recognizing voices in different application scenarios.

Figure 6:
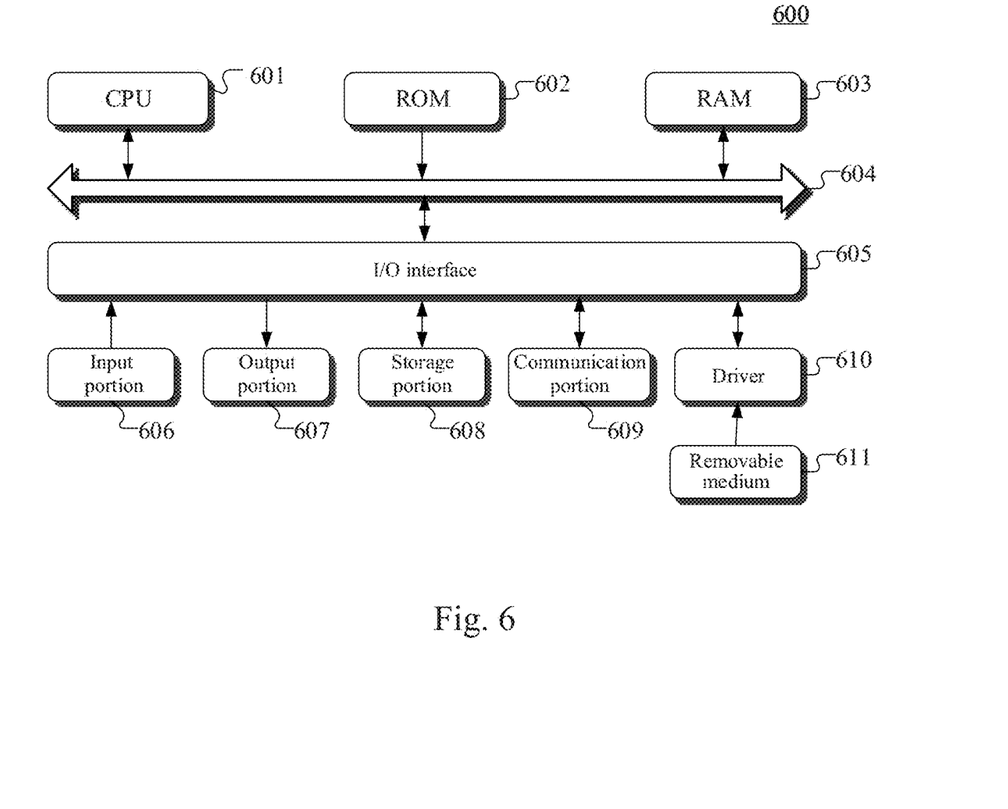
FIG. 6 is a schematic structural diagram of a computer system adapted to implement a server of the embodiments of the present disclosure.

With further reference to FIG. 6, a schematic structural diagram of a computer system 600 adapted to implement a server of the embodiments of the present disclosure is shown. The server shown in FIG. 6 is merely an example, and should not impose any limitation on the function and scope of use of the embodiments of the present disclosure.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse, etc.; an output portion 607 including such as a cathode ray tube (CRT), a liquid crystal display device (LCD), a speaker, etc.; a storage portion 608 including a hard disk and the like; and a communication portion 609 including a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610, to facilitate the retrieval of a computer program from the removable medium 611, and the installation thereof on the storage portion 608 as needed.

In particular, according to the embodiments of the present disclosure, the process described above with reference to the flow chart may be implemented in a computer software program. For example, an embodiment of the present disclosure includes a computer program product, which includes a computer program that is tangibly embedded in a computer-readable medium. The computer program includes program codes for performing the method as illustrated in the flow chart. In such an embodiment, the computer program may be downloaded and installed from a network via the communication portion 609, and/or may be installed from the removable medium 611. The computer program, when executed by the central processing unit (CPU) 601, implements the above mentioned functionalities as defined by the method of the present disclosure. It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination of any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fiber, a portable compact disk read only memory (CD-ROM), an optical memory, a magnet memory or any suitable combination of the above. In the present disclosure, the computer readable storage medium may be any physical medium containing or storing programs which may be used by a command execution system, apparatus or element or incorporated thereto. In the present disclosure, the computer readable signal medium may include data signal in the base band or propagating as parts of a carrier, in which computer readable program codes are carried. The propagating data signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logic functions. It should also be noted that, in some alternative implementations, the functions denoted by the blocks may occur in a sequence different from the sequences shown in the accompanying drawings. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system performing specified functions or operations, or by a combination of a dedicated hardware and computer instructions.

The units involved in the embodiments of the present disclosure may be implemented by means of software or hardware. The described units may also be provided in a processor, for example, may be described as: a processor including an information acquisition unit, an information determining unit, and a model selection unit. Here, the names of these units do not in some cases constitute limitations to such units themselves. For example, the information acquisition unit may also be described as "a unit for acquiring an audio signal".

In another aspect, the present disclosure further provides a computer readable medium. The computer readable medium may be included in the apparatus in the above described embodiments, or a stand-alone computer readable medium not assembled into the apparatus. The computer readable medium stores one or more programs. The one or more programs, when executed by the apparatus, cause the apparatus to: acquire an audio signal; determine a signal-to-noise ratio of the audio signal; and select a voice recognition model from a pre-trained voice recognition model group to perform voice recognition on the audio signal according to the determined signal-to-noise ratio.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the present disclosure. Technical schemes formed by the above-described features being interchanged with, but not limited to, technical features with similar functions disclosed in the present disclosure are examples.

What is claimed is:

1. A method for recognizing a voice, the method comprising:
    acquiring an audio signal;
    determining a signal-to-noise ratio of the audio signal;
    selecting, according to the determined signal-to-noise ratio, a signal-to-noise ratio range matching the signal-to-noise ratio from a signal-to-noise ratio range group; and
    selecting a voice recognition model corresponding to the selected signal-to-noise ratio range from a pre-trained voice recognition model group to perform voice recognition on the audio signal,
wherein the signal-to-noise ratio range group is determined by:
    acquiring a sample audio signal set;
    for a sample audio signal in the sample audio signal set: determining a silence segment and a noise segment of the sample audio signal; obtaining a signal-to-noise ratio of the sample audio signal based on energy of the determined silence segment and energy of the determined noise segment; and
    storing the signal-to-noise ratio of the sample audio signal into a signal-to-noise ratio set;
    generating a signal-to-noise ratio statistical histogram based on signal-to-noise ratios in the signal-to-noise ratio set, wherein the signal-to-noise ratio statistical histogram is used to indicate a distribution characteristic of signal-to-noise ratio values; and
    determining the signal-to-noise ratio range group based on the signal-to-noise ratio statistical histogram.

2. The method according to claim 1, wherein determining the signal-to-noise ratio of the audio signal comprises:
    determining a silence segment and a noise segment of the audio signal; and
    obtaining the signal-to-noise ratio of the audio signal based on energy of the silence segment and energy of the noise segment.

3. The method according to claim 1, wherein the voice recognition model in the pre-trained voice recognition model group is obtained by:
    acquiring a training sample set corresponding to the voice recognition model, wherein a training sample comprises a sample audio signal and a sample recognition result, the signal-to-noise ratio of the sample audio signal belonging to a signal-to-noise ratio range corresponding to the training sample set; and
    training to obtain the voice recognition model using a machine learning method, by taking the sample audio signal of the training sample in the training sample set as an input, and the sample recognition result of the input training sample as a desired output.

4. The method according to claim 2, wherein the voice recognition model in the pre-trained voice recognition model group is obtained by:
    acquiring a training sample set corresponding to the voice recognition model, wherein a training sample comprises a sample audio signal and a sample recognition result, the signal-to-noise ratio of the sample audio signal belonging to a signal-to-noise ratio range corresponding to the training sample set; and
    training to obtain the voice recognition model using a machine learning method, by taking the sample audio signal of the training sample in the training sample set as an input, and the sample recognition result of the input training sample as a desired output.

5. An apparatus for recognizing a voice, the apparatus comprising:
    at least one processor; and
    a memory storing instructions, the instructions when executed by the at least one processor, cause the at least one processor to perform operations, the operations comprising:
    acquiring an audio signal;
    determining a signal-to-noise ratio of the audio signal;
    selecting, according to the determined signal-to-noise ratio, a signal-to-noise ratio range matching the signal-to-noise ratio from a signal-to-noise ratio range group; and
    selecting a voice recognition model corresponding to the selected signal-to-noise ratio range from a pre-trained voice recognition model group to perform voice recognition on the audio signal,
wherein the signal-to-noise ratio range group is determined by:
    acquiring a sample audio signal set;
    for a sample audio signal in the sample audio signal set: determining a silence segment and a noise segment of the sample audio signal; obtaining a signal-to-noise ratio of the sample audio signal based on energy of the determined silence segment and energy of the determined noise segment; and storing the signal-to-noise ratio of the sample audio signal into a signal-to-noise ratio set;
    generating a signal-to-noise ratio statistical histogram based on signal-to-noise ratios in the signal-to-noise ratio set, wherein the signal-to-noise ratio statistical histogram is used to indicate a distribution characteristic of signal-to-noise ratio values; and
    determining the signal-to-noise ratio range group based on the signal-to-noise ratio statistical histogram.

6. The apparatus according to claim 5, wherein determining the signal-to-noise ratio of the audio signal comprises:
    determining a silence segment and a noise segment of the audio signal; and
    obtaining the signal-to-noise ratio of the audio signal based on energy of the silence segment and energy of the noise segment.

7. The apparatus according to claim 5, wherein the voice recognition model in the pre-trained voice recognition model group is obtained by:
    acquiring a training sample set corresponding to the voice recognition model, wherein a training sample comprises a sample audio signal and a sample recognition result, the signal-to-noise ratio of the sample audio signal belonging to a signal-to-noise ratio range corresponding to the training sample set; and training to obtain the voice recognition model using a machine learning method, by taking the sample audio signal of the training sample in the training sample set as an input and the sample recognition result of the input training sample as a desired output.

8. A non-transitory computer readable storage medium storing a computer program, wherein the computer program, when executed by a processor, causes the processor to perform operations, the operations comprising:

acquiring an audio signal;

determining a signal-to-noise ratio of the audio signal;

selecting, according to the determined signal-to-noise ratio, a signal-to-noise ratio range matching the signal-to-noise ratio from a signal-to-noise ratio range group; and selecting a voice recognition model corresponding to the selected signal-to-noise ratio range from a pre-trained voice recognition model group to perform voice recognition on the audio signal, wherein the signal-to-noise ratio range group is determined by:

acquiring a sample audio signal set;

for a sample audio signal in the sample audio signal set:
determining a silence segment and a noise segment of the sample audio signal; obtaining a signal-to-noise ratio of the sample audio signal based on energy of the determined silence segment and energy of the determined noise segment; and storing the signal-to-noise ratio of the sample audio signal into a signal-to-noise ratio set;

generating a signal-to-noise ratio statistical histogram based on signal-to-noise ratios in the signal-to-noise ratio set, wherein the signal-to-noise ratio statistical histogram is used to indicate a distribution characteristic of signal-to-noise ratio values; and determining the signal-to-noise ratio range group based on the signal-to-noise ratio statistical histogram.

9. The medium according to claim 8, wherein determining the signal-to-noise ratio of the audio signal comprises:

determining a silence segment and a noise segment of the audio signal; and obtaining the signal-to-noise ratio of the audio signal based on energy of the silence segment and energy of the noise segment.

10. The medium according to claim 8, wherein the voice recognition model in the pre-trained voice recognition model group is obtained by:

acquiring a training sample set corresponding to the voice recognition model, wherein a training sample comprises a sample audio signal and a sample recognition result, the signal-to-noise ratio of the sample audio signal belonging to a signal-to-noise ratio range corresponding to the training sample set; and training to obtain the voice recognition model using a machine learning method, by taking the sample audio signal of the training sample in the training sample set as an input, and the sample recognition result of the input training sample as a desired output.

* * * * *